May 24, 1927.

R. K. JACK 1,629,665

BATTERY SUPPORT

Filed Aug. 6, 1924

Inventor
Robert K. Jack
By his Attorneys
Blackmore, Spencer & Flint

Patented May 24, 1927.

1,629,665

UNITED STATES PATENT OFFICE.

ROBERT K. JACK, OF LANSING, MICHIGAN, ASSIGNOR TO GENERAL MOTORS CORPORATION, OF DETROIT, MICHIGAN, A CORPORATION OF DELAWARE.

BATTERY SUPPORT.

Application filed August 6, 1924. Serial No. 730,529.

This invention relates to supports for storage batteries, and is illustrated as embodied in the chassis of an Oldsmobile. An object of the invention is to provide a support which is inexpensive, in that it can be made up from four sheet-metal stampings; which is not affected by relative movement of the body and chassis frame and which is not affected by the "weaving" of the chassis frame, in that it is carried solely by one side member of the frame; and which is easily assembled in the chassis, being riveted or otherwise secured to the frame as a unit.

The novel support is shown in the accompanying drawings, in which.

Figure 1:
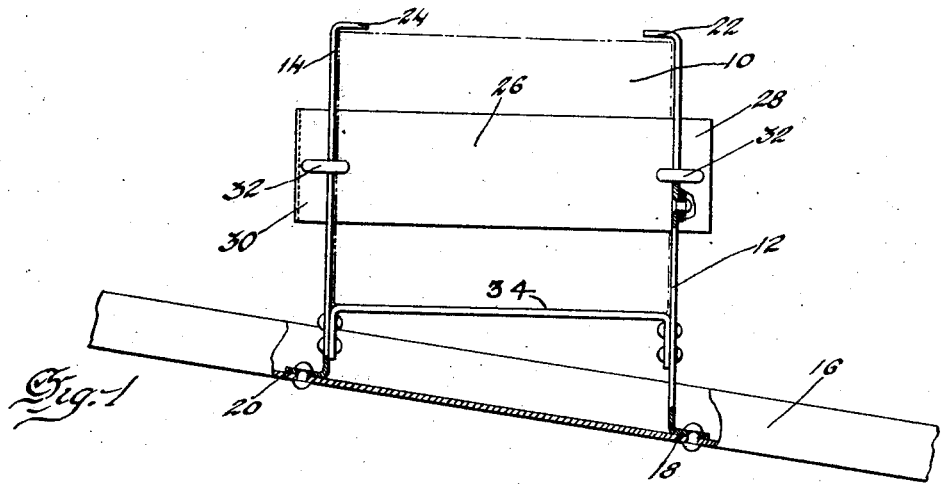
Figure 1 is a top plan view of the battery support, and part of the side chassis frame member which carries it, partly broken away.
Figure 2:
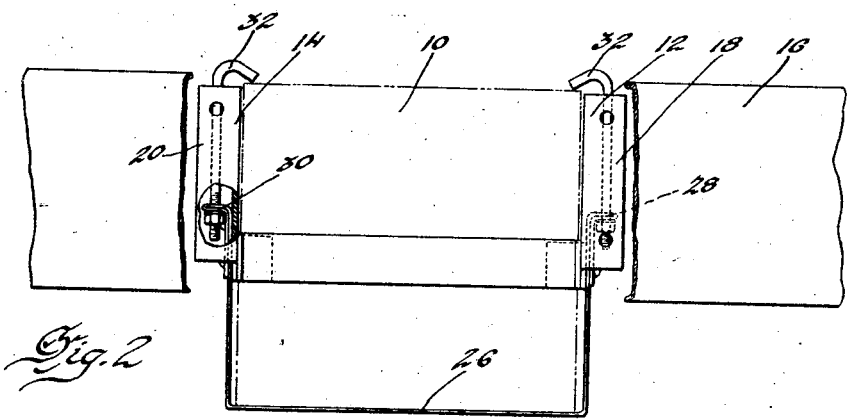
Figure 2 is a side elevation of the same parts, with the frame member broken away to show the battery support more clearly.
Figure 3:
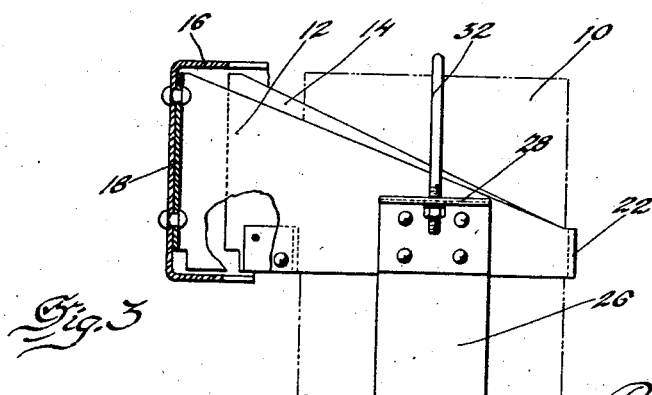
Figure 3 is a rear elevation of the support, with the frame member in vertical section, one arm of the support being partly broken away.

The support for the storage battery (indicated in dot-and-dash lines at 10) includes a pair of horizontal trapezoidal arms 12 and 14. Arm 12 is longer than arm 14, and both arms are flanged for riveting to a side channel member 16 of the chassis frame, which member is sloping or inclined with respect to the longitudinal axis of the frame, to provide the usual forwardly converging sides of the frame. Flange 18 of arm 12 is directed outwardly at an obtuse angle, and flange 20 of arm 14 is directed outwardly at a corresponding supplementary acute angle, so that the flanges are alined to be secured to the sloping frame member 16 with the arms 12 and 14 extending substantially perpendicular to the longitudinal axis of the frame. At the narrow free ends of the arms are alined flanges 22 and 24 extending toward each other at right angles to the arms to engage the inner side of battery 10.

A U-shaped member 26 has its ends riveted to arms 12 and 14, with its central cross portion supporting battery 10, and with its ends outwardly flanged at 28 and 30, the flanges being perforated to receive the usual battery hold-down clamps or hooks 32.

The outer side of battery 10 is held by a cross member 34 riveted at its opposite ends to arms 12 and 14.

While one form of support has been described in detail, it is my intention to limit the scope of the invention only by the terms of the appended claims.

I claim:

1. A storage battery support for an automobile chassis comprising, in combination, a pair of horizontal trapezoidal arms having parallel body portions and having at their broader ends outwardly directed flanges for attachment to a side chassis frame member, alined flanges extending inwardly and toward but spaced from each other at right angles from the narrow free ends of the arms to engage one side of a battery fitting between the arms, a U-shaped member having its ends secured to the middle portions of said arms and having a cross portion supporting the bottom of a battery fitting between the arms, the ends of said U-shaped member being outwardly flanged at right angles and adapted to receive battery hold-down clamps, and a cross member secured at its ends to said arms and engaging the opposite side of a battery from the flanges on the ends of the arms.

2. A storage battery support for an automobile comprising, in combination, a pair of arms having parallel body portions and provided at one end with flanges for attachment to a frame member and at the other end with inwardly extending flanges for positioning a storage battery between said arms, a U-shaped member having its ends secured to the arms and having a cross portion for supporting the bottom of the battery, clamping devices secured to the ends of said U-shaped member and adapted to engage a battery and hold it securely upon the support, and a second U-shaped member secured between said arms for limiting movement of the battery toward the frame.

3. A storage battery support to be carried by one of the members of an automobile chassis frame, including a pair of spaced arms extending laterally from a chassis frame member, having their outer extremities inturned toward but spaced from each other to form alined terminal flanges, a U-shaped strap secured at its upper ends to said arms and adapted to support a battery upon the bottom cross portion, and a brace strap connecting the lateral arms and positioning the battery to be supported on the cross portion between said terminal flanges and brace strap.

In testimony whereof I affix my signature.

ROBERT K. JACK.